United States Patent
Rogers

(10) Patent No.: US 12,006,235 B2
(45) Date of Patent: Jun. 11, 2024

(54) MONITORED INLINE HARD WATER PROCESSING ASSEMBLY

(71) Applicant: Larry Rogers, San Antonio, TX (US)

(72) Inventor: Larry Rogers, San Antonio, TX (US)

(*) Notice: Subject to any disclaimer, the term of this patent is extended or adjusted under 35 U.S.C. 154(b) by 1007 days.

(21) Appl. No.: 16/889,995

(22) Filed: Jun. 2, 2020

(65) Prior Publication Data

US 2021/0371308 A1 Dec. 2, 2021

(51) Int. Cl.
*C25B 1/04* (2021.01)
*C02F 1/461* (2023.01)
*C02F 1/48* (2023.01)
*C02F 5/00* (2023.01)

(52) U.S. Cl.
CPC ............ *C02F 1/48* (2013.01); *C02F 1/46104* (2013.01); *C02F 5/00* (2013.01); *C02F 2201/004* (2013.01); *C02F 2201/4614* (2013.01); *C02F 2201/48* (2013.01); *C02F 2303/22* (2013.01)

(58) Field of Classification Search
CPC .......... C02F 1/48; C02F 1/46104; C02F 5/00; C02F 2201/004; C02F 2201/4614; C02F 2201/48; C02F 2303/22
See application file for complete search history.

(56) References Cited

U.S. PATENT DOCUMENTS

| | | | |
|---|---|---|---|
| 4,024,047 A | 5/1977 | Clark |
| 4,419,206 A | 12/1983 | Frame |
| 5,089,145 A | 2/1992 | Fern |
| 5,230,807 A | 7/1993 | Kozlowski, II |
| 5,695,644 A | 12/1997 | Buchanan |
| 7,250,110 B2 | 7/2007 | Bruce |
| D783,773 S | 4/2017 | Hill |

*Primary Examiner* — Zulmariam Mendez

(57) ABSTRACT

A monitored inline hard water processing assembly for conditioning hard water includes a cannister, which is cathodic, a disc, and a rod, which is anodic. The disc is removably couplable to a top of the cannister. The disc has a pair of channels positioned therethrough, each of which is in fluidic communication with an interior space defined by the cannister. The rod is removably couplable to the disc so that the rod is electrically insulated from the disc and extends into the interior space. A monitoring unit, which is electrically coupled to the cannister and the rod, is operationally couplable to a source of electrical current to provide a flow of direct current through the rod, the cannister, and water flowing therethrough. The monitoring unit comprises an indicator, which can indicate at least two resistance states of the rod.

7 Claims, 6 Drawing Sheets

MONITORED INLINE HARD WATER PROCESSING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to water processing assemblies and more particularly pertains to a new water processing assembly for conditioning hard water.

(2) Description of Related Art Including Information Disclosed Under 37 CFR 1.97 and 1.98

The prior art relates to water processing assemblies. Prior art water processing assemblies may comprise cannisters, which are cathodic, rods, which are anodic, and integral monitors.

BRIEF SUMMARY OF THE INVENTION

An embodiment of the disclosure meets the needs presented above by generally comprising a cannister, which is cathodic, a disc, and a rod, which is anodic. The disc is removably couplable to a top of the cannister. The disc has a pair of channels positioned therethrough, each of which is in fluidic communication with an interior space defined by the cannister. The rod is removably couplable to the disc so that the rod is electrically insulated from the disc and extends into the interior space. A monitoring unit, which is electrically coupled to the cannister and the rod, is configured to be operationally coupled to a source of electrical current to provide a flow of direct current through the rod, the cannister, and water flowing therethrough. The monitoring unit comprises an indicator configured to indicate at least two resistance states of the rod.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
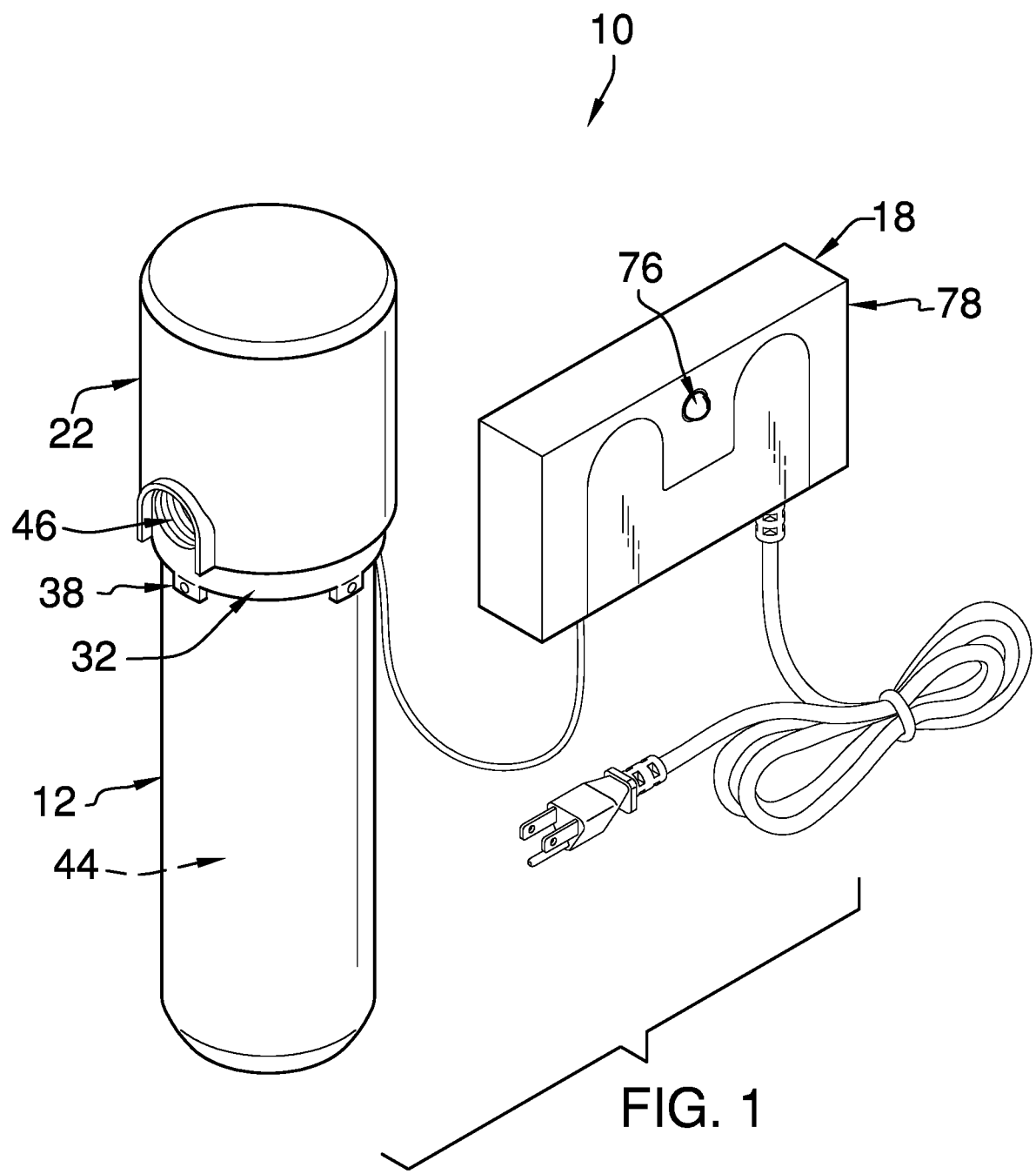
FIG. 1 is an isometric perspective view of a monitored inline hard water processing assembly according to an embodiment of the disclosure.

With reference now to the drawings, and in particular to FIGS. 1 through 7 thereof, a new water processing assembly embodying the principles and concepts of an embodiment of the disclosure and generally designated by the reference numeral 10 will be described.

As best illustrated in FIGS. 1 through 7, the monitored inline hard water processing assembly 10 generally comprises a cannister 12, which is cathodic, a disc 14, a rod 16, which is anodic, and a monitoring unit 18. The rod 16 may comprise graphite and the disc 14 may comprise brass. The disc 14 is removably couplable to a top 20 of the cannister 12. The assembly 10 also comprises a cap 22, which is positioned for insertion of the disc 14 so that the cap 22 is removably coupled to the disc 14.

The disc 14 has external threads 24 extending circumferentially around a side 26, proximate to a lower face 28, thereof. A lip 30 is coupled to and extends radially and outwardly from the top 20 of the cannister 12. A ring 32, which is internally threaded, is positioned for insertion of the cannister 12 so that lower limit 34 of the ring 32 abuts the lip 30. The ring 32 is positioned for threaded insertion of the disc 14 to couple the disc 14 to the cannister 12. A primary gasket 36 is positionable between the disc 14 and the top 20 of the cannister 12 so that the disc 14 is sealably coupled to the cannister 12.

A tab 38 is coupled to the ring 32. An orifice 40, which is internally threaded, is positioned in the tab 38. The orifice 40 is configured to threadedly engage a tool (not shown), positioning a user to apply torque to the tool to rotate the ring 32 relative to the cannister 12.

Figure 2:
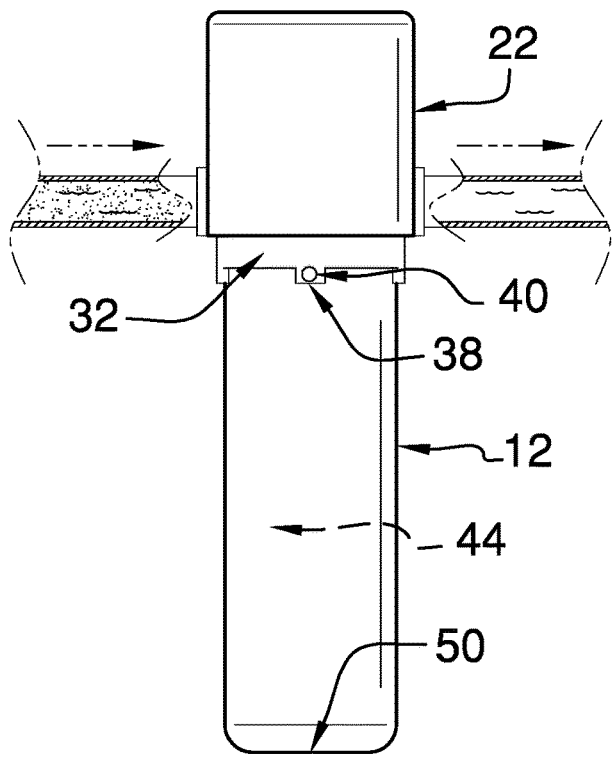
FIG. 2 is an in-use view of an embodiment of the disclosure.
Figure 3:
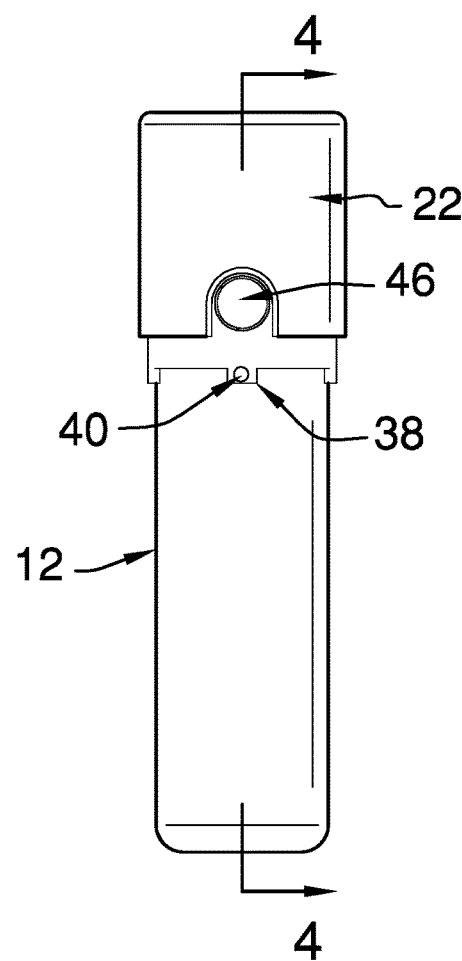
FIG. 3 is a side view of an embodiment of the disclosure.
Figure 4:
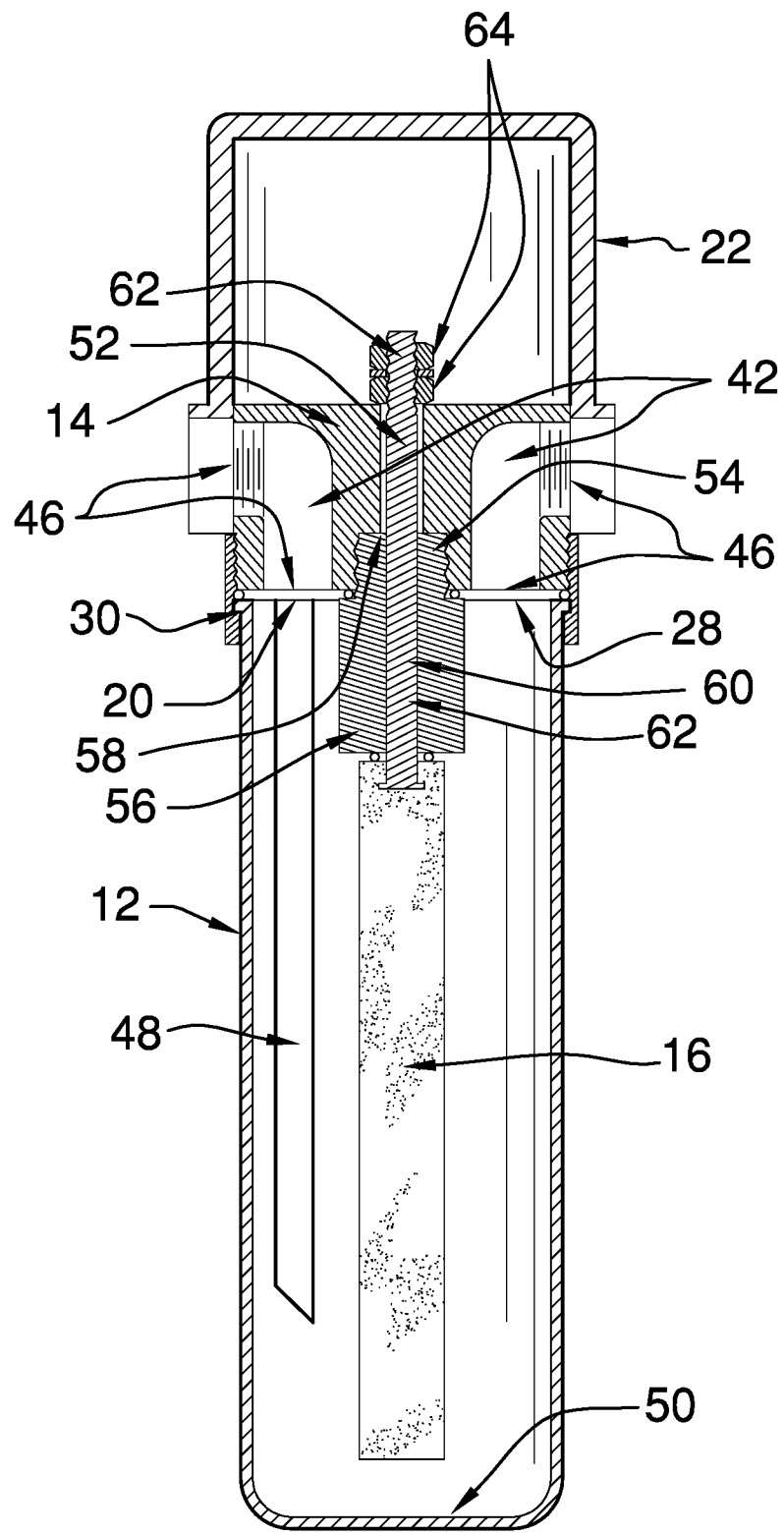
FIG. 4 is a cross-sectional view of an embodiment of the disclosure.
Figure 5:
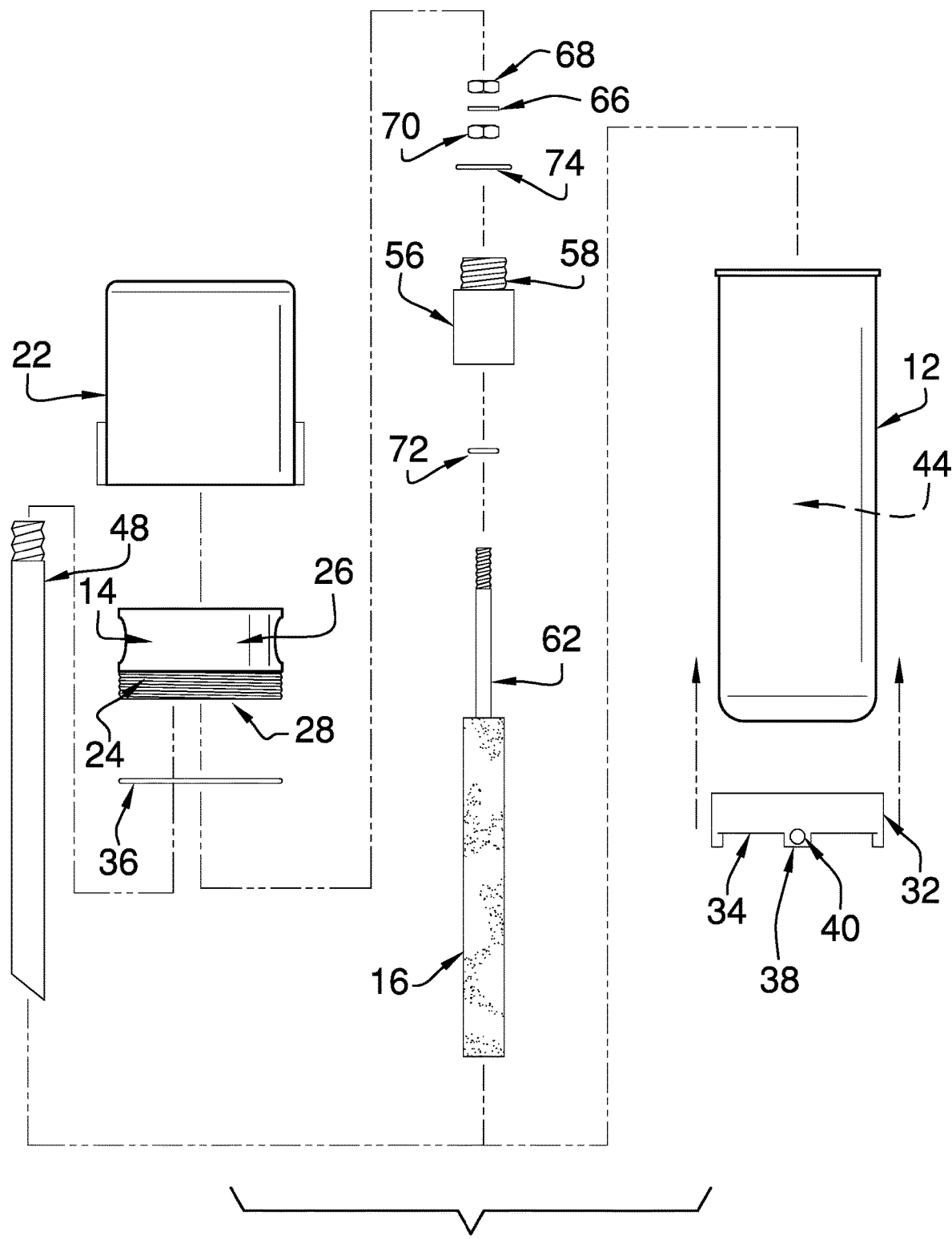
FIG. 5 is an exploded view of an embodiment of the disclosure.
Figure 6:
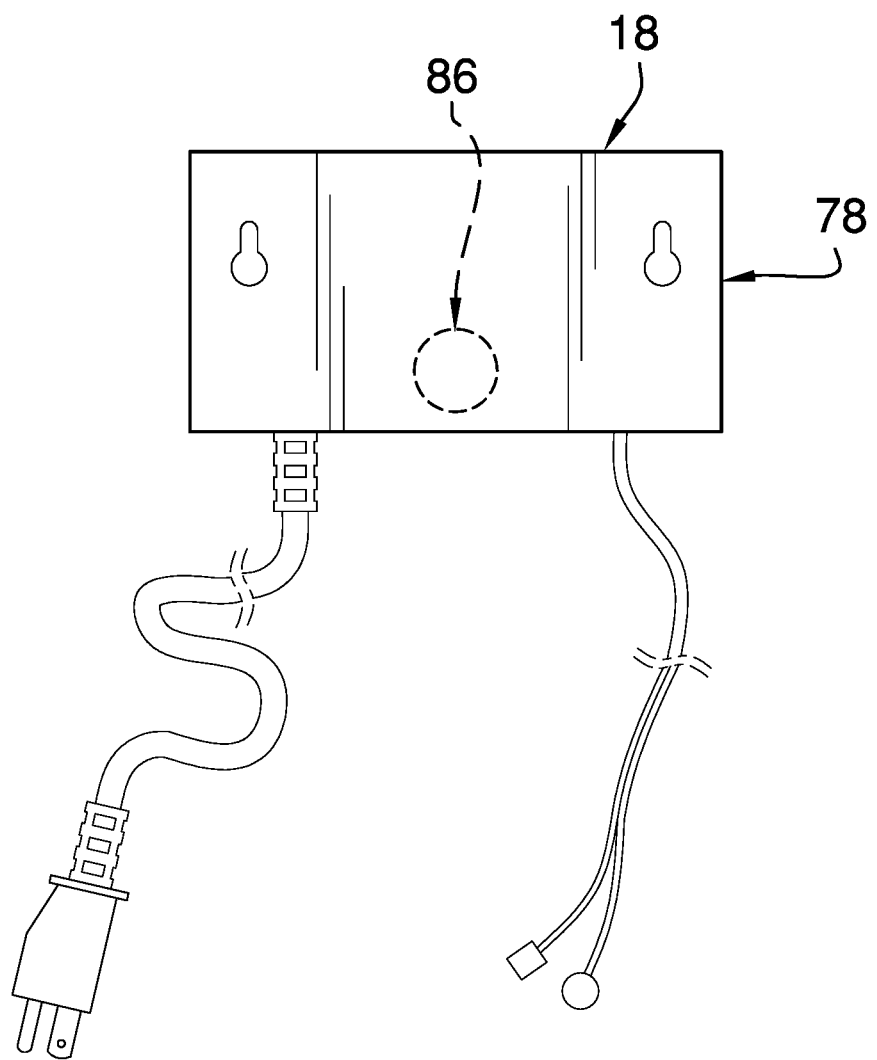
FIG. 6 is a back view of an embodiment of the disclosure.

The disc 14 has a pair of channels 42 positioned therethrough, each of which is in fluidic communication with an interior space 44 defined by the cannister 12. Each channel 42 defines a pair of openings 46. The channels 42 are internally threaded adjacent to the openings 46. One of the openings 46 of the pair of openings 46 is positioned in the side 26 of the disc 14. The one of the openings 46 is configured to threadedly couple to one of a water inlet pipe and a water outlet pipe, as shown in FIG. 2.

The other of the openings 46 of the pair of openings 46 is positioned in the lower face 28. A pipe 48 is threadedly couplable to the disc 14. The pipe 48 extends from a respective one of the openings 46 in the lower face 28 into the interior space 44 so that water entering the cannister 12 is introduced proximate to a bottom 50 thereof.

The rod 16 is removably couplable to the disc 14 so that the rod 16 is electrically insulated from the disc 14 and extends into the interior space 44. The disc 14 has a first bolt hole 52 positioned axially therethrough and a recess 54 extending axially into the lower face 28. The recess 54 is internally threaded. An insulator 56 is externally threaded adjacent to an upper end 58 thereof so that the upper end 58 is positioned to be threadedly inserted into the recess 54 to couple the insulator 56 to the disc 14.

The insulator 56 has a second bolt hole 60 positioned axially therethrough so that the second bolt hole 60 is aligned with the first bolt hole 52. A bolt 62, which is coupled to and which extends axially from the rod 16, is positioned to be inserted through the second bolt hole 60 and the first bolt hole 52. A pair of nuts 64 is couplable to the bolt 62 distal from the rod 16 so that the rod 16 is coupled to the disc 14. A washer 66 is positionable around the bolt 62 between the nuts 64 of the pair of nuts 64 so that an upper one 68 of the pair of nuts 64 is selectively lockable to a lower one 70 of the pair of nuts 64.

A lower gasket 72 is positionable around the bolt 62 between the insulator 56 and the rod 16. An upper gasket 74 is positionable around the bolt 62 between the lower one 70 of the pair of nuts 64 and the disc 14. The upper gasket 74 and the lower gasket 72 seal the first bolt hole 52 and the second bolt hole 60.

The monitoring unit 18, which is electrically coupled to the cannister 12 and the rod 16, is configured to be operationally coupled to a source of electrical current to provide a flow of direct current through the rod 16, the cannister 12, and water flowing therethrough. The monitoring unit 18 comprises an indicator 76 configured to indicate at least two resistance states of the rod 16.

Figure 7:
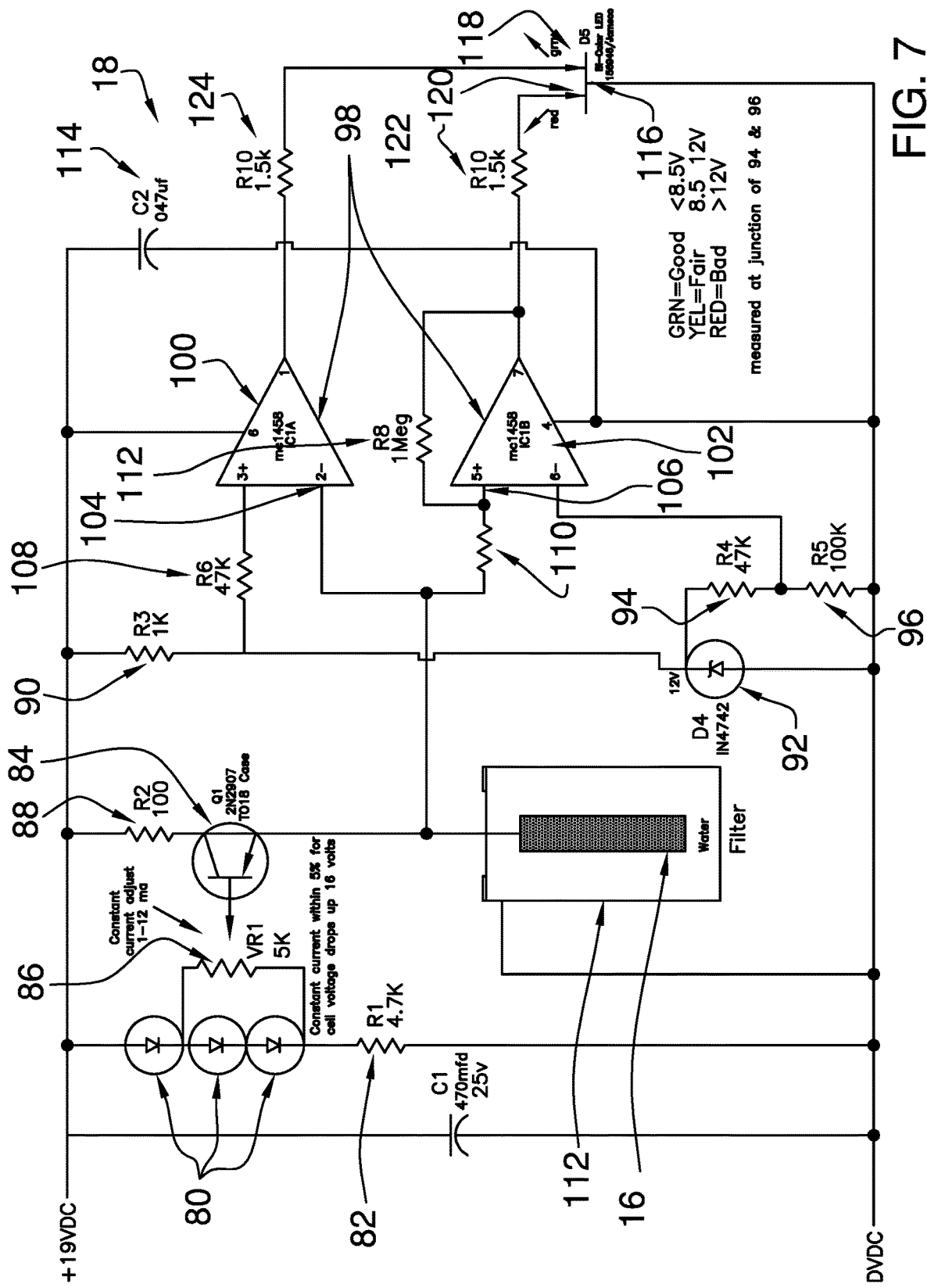
FIG. 7 is an electrical schematic diagram of an embodiment of the disclosure.

The monitoring unit 18 comprises a housing 78, which is configured to be mountable to a substantially vertical surface. As shown in FIG. 7, the housing 78 has coupled thereto and positioned therein:

1. a set of three diodes 80 and a first resistor 82, which are configured to generate a bias reference for a transistor 84, 2. a potentiometer 86, which is operationally engaged to the set of three diodes 80 and the transistor 84. The potentiometer 86 is configured to adjust the bias reference between approximately 0.65 and 1.95 volts, 3. a second resistor 88, which is operationally engaged to the transistor 84. The second resistor 88 and the potentiometer 86 are configured to control a current passing from the transistor 84 between 0.25 and 15.0 milliamperes, 4. a third resistor 90 and a Zener diode 92, which are configured to provide a 12.0 volt reference current, 5. a fourth resistor 94 and a fifth resistor 96, which are configured to divide voltage for provide an 8.5 volt reference current, 6. an integrated circuit 98, which comprises a first voltage comparator 100 and a second voltage comparator 102. A negative input 104 of the first voltage comparator 100 and a positive input 106 of the second voltage comparator 102 are operationally coupled to the rod 16. The integrated circuit 98 is configured to compare a voltage of the current passing through the rod 16 to the 8.5 and 12.0 reference currents, 7. a sixth resistor 108 and a seventh resistor 110 are engaged to the integrated circuit 98 and are configured to provide operating bias thereto, 8. an eight resistor 112 and a capacitor 114 are engaged to the integrated circuit 98 and are configured to provide voltage feedback thereto, 9. a dual light emitting diode 116, which is engaged to the housing 78 so that the dual light emitting diode 116 is visible to a user, comprises the indicator 76. The present invention anticipates the indicator 76 comprising other indicating means, such as, but not limited to, audio signals, text message, email messages, and the like. The dual light emitting diode 116 is operationally coupled to the integrated circuit 98 and is configured to selectively emit green and red light. The dual light emitting diode 116 comprises a green chip 118 and a red chip 120, 10. a ninth resistor 122, which is operationally coupled to the second voltage comparator 102 and the green chip 118, is positioned to limit current to the green chip 118, and 11. a tenth resistor 124, which is operationally coupled to the first voltage comparator 100 and the red chip 120, is positioned to limit current to the red chip 120.

The integrated circuit 98 is positioned to actuate the dual light emitting diode 116 to emit green light for a first range of voltage of the current through the rod 16, to emit green light and red light—which appears as yellow light—for a second range of voltage of the current through the rod 16, and to emit red light for a third range of voltage of the current through the rod 16. The first range is from 0.0 to 8.5 volts and indicates that the rod 16 is in good condition. The second range is from 8.5 to 12.0 volts and indicates that the rod 16 is in fair condition but soon may require servicing. The third range is greater than 12.0 volts and indicates that the rod 16 is in bad condition and requires immediate servicing.

In use, the assembly 10 conditions the water to prevent scaling. The monitoring unit 18 continuously monitors the rod 16 and lets the user know, via the indicator 76, the condition of the rod 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A monitored inline hard water processing assembly comprising:
   a cannister, the cannister being cathodic;
   a disc removably couplable to a top of the cannister, the disc having a pair of channels positioned therethrough such that each channel is in fluidic communication with an interior space defined by the cannister;
   a rod removably couplable to the disc such that the rod is electrically insulated from the disc and extends into the interior space, the rod being anodic;
   a monitoring unit electrically coupled to the cannister and the rod, the monitoring unit being configured for operationally coupling to a source of electrical current for providing a flow of direct current through the rod, the cannister, and water flowing therethrough, the monitoring unit comprising an indicator configured for indicating at least two resistance states of the rod;
   the disc having a first bolt hole positioned axially therethrough;
   the disc having a lower face, the lower face having a recess extending axially thereinto, the recess being internally threaded;
   an insulator, the insulator being externally threaded adjacent to an upper end thereof, such that the upper end is positioned for threadedly inserting into the recess for coupling the insulator to the disc, the insulator having a second bolt hole positioned axially therethrough such that the second bolt hole is aligned with the first bolt hole;
   a bolt coupled to and extending axially from the rod such that the bolt is positioned for inserting through the second bolt hole and the first bolt hole; and
   a pair of nuts couplable to the bolt distal from the rod such that the rod is coupled to the disc.

2. The monitored inline hard water processing assembly of claim 1, further including a washer positionable around the bolt between the nuts of the pair of nuts, such that an upper one of the pair of nuts is selectively lockable to a lower one of the pair of nuts.

3. The monitored inline hard water processing assembly of claim 1, further including:
   a lower gasket positionable around the bolt between the insulator and the rod;
   an upper gasket positionable around the bolt between the lower one of the pair of nuts and the disc such that the upper gasket and the lower gasket seal the first bolt hole and the second bolt hole.

4. A monitored inline hard water processing assembly comprising:
   a cannister, the cannister being cathodic;
   a disc removably couplable to a top of the cannister, the disc having a pair of channels positioned therethrough such that each channel is in fluidic communication with an interior space defined by the cannister;
   a rod removably couplable to the disc such that the rod is electrically insulated from the disc and extends into the interior space, the rod being anodic;
   a monitoring unit electrically coupled to the cannister and the rod, the monitoring unit being configured for operationally coupling to a source of electrical current for providing a flow of direct current through the rod, the cannister, and water flowing therethrough, the monitoring unit comprising an indicator configured for indicating at least two resistance states of the rod; and
   the monitoring unit comprising a housing configured to be mountable to a substantially vertical surface, the housing having coupled thereto and positioned therein:
   a set of three diodes and a first resistor configured for generating a bias reference for a transistor;
   a potentiometer operationally engaged to the set of three diodes and the transistor, the potentiometer being configured for adjusting the bias reference between approximately 0.65 and 1.95 volts;
   a second resistor operationally engaged to the transistor wherein the second resistor and the potentiometer are configured for controlling a current passing from the transistor between 0.25 and 15.0 milliamperes;
   a third resistor and a Zener diode configured for providing a 12.0 volt reference current;
   a fourth resistor and a fifth resistor configured for dividing voltage for providing an 8.5 volt reference current;
   an integrated circuit comprising a first voltage comparator and a second voltage comparator, a negative input of the first voltage comparator being operationally coupled to the rod, a positive input of second voltage comparator being operationally coupled to the rod, wherein the integrated circuit is configured for comparing a voltage of the current passing through the rod to the 8.5 and 12.0 reference currents;
   a sixth resistor and a seventh resistor engaged to the integrated circuit and being configured for providing operating bias thereto;
   an eight resistor and a capacitor engaged to the integrated circuit and being configured for providing voltage feedback thereto; and
   the indicator comprising a dual light emitting diode engaged to the housing such that the dual light emitting diode is visible to a user, the dual light emitting diode configured for selectively emitting green and red light, the dual light emitting diode being operationally coupled to the integrated circuit, such that the integrated circuit is positioned for actuating the dual light emitting diode for emitting green light for a first range of voltage of the current through the rod, for emitting green light and red light for a second range of voltage of the current through the rod, and for emitting and red light for a third range of voltage of the current through the rod.

5. The monitored inline hard water processing assembly of claim 4, further including:
   the dual light emitting diode comprising a green chip and a red chip;
   a ninth resistor operationally coupled to the second voltage comparator and the green chip such that the tenth resistor is positioned for limiting current to the green chip; and
   a tenth resistor operationally coupled to the first voltage comparator and the red chip such that the tenth resistor is positioned for limiting current to the red chip.

6. The monitored inline hard water processing assembly of claim 4, wherein the first range is from 0.0 to 8.5 volts, the second range is from 8.5 to 12.0 volts, and the third range is greater than 12.0 volts.

7. A monitored inline hard water processing assembly comprising:
   a cannister, the cannister being cathodic;
   a disc removably couplable to a top of the cannister, the disc having a pair of channels positioned therethrough such that each channel is in fluidic communication with an interior space defined by the cannister, the disc comprising brass, the disc having a first bolt hole positioned axially therethrough, the disc having a lower face, the lower face having a recess extending axially thereinto, the recess being internally threaded, each channel defining a pair of openings, the channels being internally threaded adjacent to the openings, one of the openings of the pair of openings being positioned in the side of the disc such that the one of the openings is configured for threadedly coupling to one of a water inlet pipe and a water outlet pipe, the other of the openings of the pair of openings being positioned in the lower face, the disc having external threads extending circumferentially around a side thereof proximate to the lower face;

a lip coupled to and extending radially and outwardly from the top of the cannister;

a ring, the ring being internally threaded, such that the ring is positioned for inserting the cannister such that a lower limit of the ring abuts the lip, positioning the ring for threadedly inserting the disc for coupling the disc to the cannister;

a tab coupled to the ring;

an orifice positioned in the tab, the orifice being internally threaded, wherein the orifice is configured for threadedly engaging a tool, positioning a user for applying torque to the tool for rotating the ring relative to the cannister;

a primary gasket positionable between the disc and the top of the cannister such that the disc is sealably coupled to the cannister;

a cap positioned for inserting the disc such that the cap is removably coupled to the disc;

a rod removably couplable to the disc such that the rod is electrically insulated from the disc and extends into the interior space, the rod being anodic, the rod comprising graphite;

an insulator, the insulator being externally threaded adjacent to an upper end thereof, such that the upper end is positioned for threadedly inserting into the recess for coupling the insulator to the disc, the insulator having a second bolt hole positioned axially therethrough such that the second bolt hole is aligned with the first bolt hole;

a bolt coupled to and extending axially from the rod such that the bolt is positioned for inserting through the second bolt hole and the first bolt hole;

a pair of nuts couplable to the bolt distal from the rod such that the rod is coupled to the disc;

a washer positionable around the bolt between the nuts of the pair of nuts, such that an upper one of the pair of nuts is selectively lockable to a lower one of the pair of nuts;

a lower gasket positionable around the bolt between the insulator and the rod;

an upper gasket positionable around the bolt between the lower one of the pair of nuts and the disc such that the upper gasket and the lower gasket seal the first bolt hole and the second bolt hole;

a pipe threadedly couplable to the disc such that the pipe extends from a respective one of the openings in the lower face into the interior space, such that water entering the cannister is introduced proximate to a bottom thereof; and a monitoring unit electrically coupled to the cannister and the rod, the monitoring unit being configured for operationally coupling to a source of electrical current for providing a flow of direct current through the rod, the cannister, and water flowing therethrough, the monitoring unit comprising an indicator configured for indicating at least two resistance states of the rod, the monitoring unit comprising a housing configured to be mountable to a substantially vertical surface, the housing having coupled thereto and positioned therein:

a set of three diodes and a first resistor configured for generating a bias reference for a transistor, a potentiometer operationally engaged to the set of three diodes and the transistor, the potentiometer being configured for adjusting the bias reference between approximately 0.65 and 1.95 volts, a second resistor operationally engaged to the transistor wherein the second resistor and the potentiometer are configured for controlling a current passing from the transistor between 0.25 and 15.0 milliamperes, a third resistor and a Zener diode configured for providing a 12.0 volt reference current, a fourth resistor and a fifth resistor configured for dividing voltage for providing an 8.5 volt reference current, an integrated circuit comprising a first voltage comparator and a second voltage comparator, a negative input of the first voltage comparator being operationally coupled to the rod, a positive input of second voltage comparator being operationally coupled to the rod, wherein the integrated circuit is configured for comparing a voltage of the current passing through the rod to the 8.5 and 12.0 reference currents, a sixth resistor and a seventh resistor engaged to the integrated circuit and being configured for providing operating bias thereto, an eight resistor and a capacitor engaged to the integrated circuit and being configured for providing voltage feedback thereto, the indicator comprising a dual light emitting diode engaged to the housing such that the dual light emitting diode is visible to the user, the dual light emitting diode configured for selectively emitting green and red light, the dual light emitting diode being operationally coupled to the integrated circuit, such that the integrated circuit is positioned for actuating the dual light emitting diode for emitting green light for a first range of voltage of the current through the rod, for emitting green light and red light for a second range of voltage of the current through the rod, and for emitting and red light for a third range of voltage of the current through the rod, the first range being from 0.0 to 8.5 volts, the second range being from 8.5 to 12.0 volts, the third range being greater than 12.0 volts, the dual light emitting diode comprising a green chip and a red chip, a ninth resistor operationally coupled to the second voltage comparator and the green chip such that the tenth resistor is positioned for limiting current to the green chip, and a tenth resistor operationally coupled to the first voltage comparator and the red chip such that the tenth resistor is positioned for limiting current to the red chip.

* * * * *